(12) United States Patent
Markert et al.

(10) Patent No.: US 7,464,622 B2
(45) Date of Patent: Dec. 16, 2008

(54) MANIPULATOR SUCH AS IN INDUSTRIAL ROBOT AND METHOD FOR INFLUENCING AN AMBIENT CONDITION THEREIN

(75) Inventors: Joachim Markert, Augsburg (DE); Günther Merk, Altenmünster (DE)

(73) Assignee: KUKA Roboter GmbH, Augsburg (DE)

( * ) Notice: Subject to any disclaimer, the term of this patent is extended or adjusted under 35 U.S.C. 154(b) by 789 days.

(21) Appl. No.: 11/002,746

(22) Filed: Dec. 2, 2004

(65) Prior Publication Data

US 2005/0126327 A1 Jun. 16, 2005

(30) Foreign Application Priority Data

Dec. 10, 2003 (DE) ................. 103 57 609

(51) Int. Cl.
*B25J 17/00* (2006.01)
(52) U.S. Cl. .................. 74/490.01; 74/490.05
(58) Field of Classification Search .......... 74/490.01, 74/490.02, 490.03, 490.05, 490.06; 901/49
See application file for complete search history.

(56) References Cited

U.S. PATENT DOCUMENTS

| 4,698,568 | A | 10/1987 | Nishizawa et al. |
| 4,716,785 | A | 1/1988 | Godai et al. |
| 4,892,992 | A | * 1/1990 | Akeel et al. ............ 219/121.78 |
| 4,984,745 | A | 1/1991 | Akeel et al. |
| 5,212,432 | A | 5/1993 | Ohtani et al. |
| 5,421,218 | A | 6/1995 | Akeel et al. |
| 5,949,209 | A | 9/1999 | Okamoto et al. |
| 6,039,068 | A | 3/2000 | Tessier et al. |
| 6,267,022 | B1 | 7/2001 | Suzuki |
| 6,477,913 | B1 | 11/2002 | Akeel et al. |
| 6,920,375 | B2 * | 7/2005 | Enric ................ 700/258 |

FOREIGN PATENT DOCUMENTS

| DE | 36 01 437 | 7/1986 |
| DE | G 90 10 796.9 | 10/1990 |
| DE | 698 09 440 | 10/2003 |
| EP | 0 245 530 | 11/1987 |
| EP | 0 447 881 | 9/1991 |
| WO | WO 00/29177 | 5/2000 |

* cited by examiner

*Primary Examiner*—David M Fenstermacher
(74) *Attorney, Agent, or Firm*—McGlew & Tuttle, P.C.

(57) ABSTRACT

A manipulator, such as a multiaxial industrial robot (1), particularly for use in contamination-endangered environments, including a plurality of scavenging areas (1.8a, 1.8b) to which a scavenging medium can be supplied and located in the vicinity of the drive unit of the manipulator. A plurality of groups of drive units has in each case its own scavenging area (1.8a, 1.8b) associated with it. A method is also provided for influencing at least one ambient condition, such as temperature, humidity, pressure, contamination and/or bacterial presence, in the vicinity of the drive units of a manipulator. This reliably ensures a safe operation of the inventive manipulator (1), even in areas with strict hygiene requirements.

34 Claims, 3 Drawing Sheets

MANIPULATOR SUCH AS IN INDUSTRIAL ROBOT AND METHOD FOR INFLUENCING AN AMBIENT CONDITION THEREIN

FIELD OF THE INVENTION

The invention relates to a method for influencing at least one ambient condition, such as temperature, humidity, pressure, contamination and/or bacterial presence, in the vicinity of drive units of the manipulator, such as a multiaxial industrial robot. The invention also relates to a manipulator, such as a multiaxial industrial robot, particularly for use in contamination-endangered environments, with a plurality of scavenging areas subject to the action of a scavenging medium in the vicinity of drive units of the manipulator.

BACKGROUND OF THE INVENTION

Manipulators, particularly in automated form as multiple industrial robots, hereinafter called robots for short, are nowadays used in many different fields of technology. When using such robots in contamination-endangered environments, such as in the food processing industry or pharmaceutical industry, it must be very strictly ensured that there is no infringement of hygiene regulations as a result of the release of abrasive particles and/or lubricant vapours. A source for such contamination is in particular the joint areas of the robot, in which are located the drive units for the moving parts of the robot with their motors and various components moved relative to one another, which also leads to the presence of lubricants and open interfaces in the robot structure, so that at these points the indicated contamination effects occur, particularly due to friction effects.

In order to counteract a restriction to the usability of the robot as a result of this, WO 00/29177 proposes surrounding the entire drive mechanisms of a robot with a pressure-tight casing and to ensure therein a closed cooling gas flow for cooling purposes.

It is particularly disadvantageous in this connection that as a result of the cladding of the entire manipulator, particularly in the case of a six-axial industrial robot, a considerable restriction to the mobility of the manipulator must be expected. Due to the closed flow path in WO 00/29177, it is not possible to remove from the interior of the casing moisture and other contaminations, so that bacterial concentrations can possibly arise there and therefore there is an increased contamination risk.

It is also known in connection with robots for explosion protection purposes, to house the entire robot or some of its drive units in a sealed casing. EP 203 202 A1 discloses an industrial robot, in whose interior is provided a cohesive scavenging area for the drive units subject to the action of a pressure medium. In EP 245 530 A1 a motor means for a robot hand is placed in a cladding subject to the action of a pressure medium. In DE 36 27 775 A1 drive units of an industrial robot are placed in individual, air-tight containers, into which the compressed air is introduced as inert gas.

The problem of the invention is to further develop a method and a manipulator of the aforementioned type in such a way that a reliable usability of the manipulator in contamination-endangered environments is rendered possible in a constructionally simple and therefore particularly inexpensive manner.

SUMMARY OF THE INVENTION

In the case of a method of the aforementioned type, this problem is solved in that a plurality of scavenging areas provided for in each case one group of drive units is subject to the action of a scavenging medium. With a manipulator of the aforementioned type, this problem is solved in that with a plurality of groups of drive units is in each case associated its own scavenging area. Thus, according to the invention, in a simple and flexibly usable manner, the reliability of use of a manipulator is ensured, particularly in contamination-endangered environments.

Particularly in connection with the above-described set problem, according to a preferred embodiment of the inventive method, the scavenging area is subject to the action of an overpressure and in a preferred development of the inventive manipulator, the scavenging areas are subject to pressure action. The scavenging medium is consequently introduced into the scavenging areas with a possibly very limited overpressure, i.e. they are definitively scavenged with the gaseous scavenging medium, which is blown into the scavenging areas and blown out via outlets forming resistors, so that according to this development there is at least a limited overpressure which is maintained in the scavenging areas. Thus, there is a cooling effect for the drive units and due to a dry scavenging medium also a drying effect, particularly for preventing the controlled penetration of dirt from the robot environment, so that an inventively designed robot can be used in a non-clean or contaminated environment. In addition, the parameters of the scavenging medium such as heat and dryness can be suitably controlled and adjusted and the scavenging medium can be provided with a disinfectant fraction. This permits the hygienic use of a robot more particularly in the food sector. In particular, the seals of the scavenging areas are such that adequate hygiene is ensured and the ambient is not endangered by biological contamination.

According to a further development of the method according to the invention, a supply and/or removal of the scavenging medium is separately controlled for each scavenging area, which leads to a further increase in the flexibility of use of the robot. Correspondingly, according to a further development of the inventive manipulator, a scavenging medium pressure is separately controllable in each scavenging area.

The method according to the invention can be used to act in planned manner on the ambient conditions in the vicinity of a manipulator drive units. According to a preferred development of the inventive method, for achieving a cooling action the scavenging medium is cooled, at least following a through-flow of a scavenging area. Correspondingly, for regulating the humidity, the scavenging medium is dried, at least after flowing through a scavenging area. For removing contamination, such as abrasive particles, at least after flowing through a scavenging area, the scavenging medium is filtered. In order to prevent a formation of contamination sources, such as bacterial concentrations, according to an extremely preferred development of the inventive method, the scavenging medium is mixed with a disinfectant prior to a through-flow of a scavenging area.

Alternatively, in the case of a scavenging medium flow through the scavenging areas, an open or a closed circuit can be used. According to further developments of the inventive method, after flowing through one of the scavenging areas, the scavenging medium is either delivered to the environment or is again supplied to the scavenging area. According to corresponding developments of the inventive manipulator, supply and discharge hoses for at least one scavenging area form a closed circuit or a medium removed from at least one scavenging area can be delivered to the environment.

In order to bring about an optimum influencing of said ambient conditions, according to another variant of the inventive method, the scavenging medium is given a clearly defined flow movement in at least one scavenging area.

In order in planned manner to prevent the penetration of substances, such as moisture, into the robot, preferably the scavenging medium is supplied to at least one scavenging area with a pressure above ambient pressure. However, it can also be appropriate to supply the scavenging medium to at least one scavenging area with a pressure lower than ambient pressure or to suck it through the scavenging areas, e.g. if in planned manner an escape of substances from the robot into the environment is to be prevented.

In order to bring about a very simple, inexpensive development of the manipulator according to the invention, scavenging medium can be supplied and/or removed by hoses positioned externally on the manipulator. Preferably a plurality of supply and/or removal hoses are placed together with a cable arrangement for the supply and control of drive units. According to an extremely preferred development of the invention, the scavenging medium can be removed via a protective hose of the cable arrangement. In this way the components which are in any case present in a manipulator of the aforementioned type are co-used in optimum manner in the sense of the invention.

On the basis of the aforementioned considerations are provided further developments of the inventive manipulator in such a way that the pressure of the scavenging medium in at least one scavenging area is above ambient pressure or in at least one scavenging area below ambient pressure. The overpressure is preferably 0.1 to 1.0 bar. In order to produce an underpressure or vacuum in the scavenging areas, the scavenging medium can be sucked from at least one scavenging area by means of a suction device.

In order to produce a clearly defined flow movement in the scavenging areas in the sense of the method according to the invention, in a preferred development of the inventive manipulator, at least one scavenging area has intake means or deflecting means for influencing a scavenging medium flow.

For handling reasons, the pressure medium is preferably a gas or gaseous mixture and in an extremely preferred development air is used in at least one scavenging area. However, for specific applications, it is also possible to use an inert gas as the scavenging medium in at least one scavenging area. For sterilizing or disinfecting purposes in at least one scavenging area the scavenging medium can contain disinfecting substances.

According to further developments of the manipulator according to the invention, the latter has a drying device and/or a filtering device and/or a heat exchange device for the planned conditioning of the scavenging medium.

Specifically in conjunction with a six-axial industrial robot, at least one scavenging area for the corresponding drive units is located in the vicinity of a rotation axis of a carrousel and the swivelling axis of a rocker of a six-axial industrial robot. In addition, at least one scavenging area for the corresponding drive units of a robot arm or robot hand can be located in the vicinity of the swivelling axis of the robot arm of a six-axial industrial robot.

BRIEF DESCRIPTION OF THE DRAWINGS

Further characteristics and advantages of the invention can be gathered from a description of an embodiment relative to the attached drawings, wherein show.

DETAILED DESCRIPTION OF THE DRAWINGS

Figure 1:
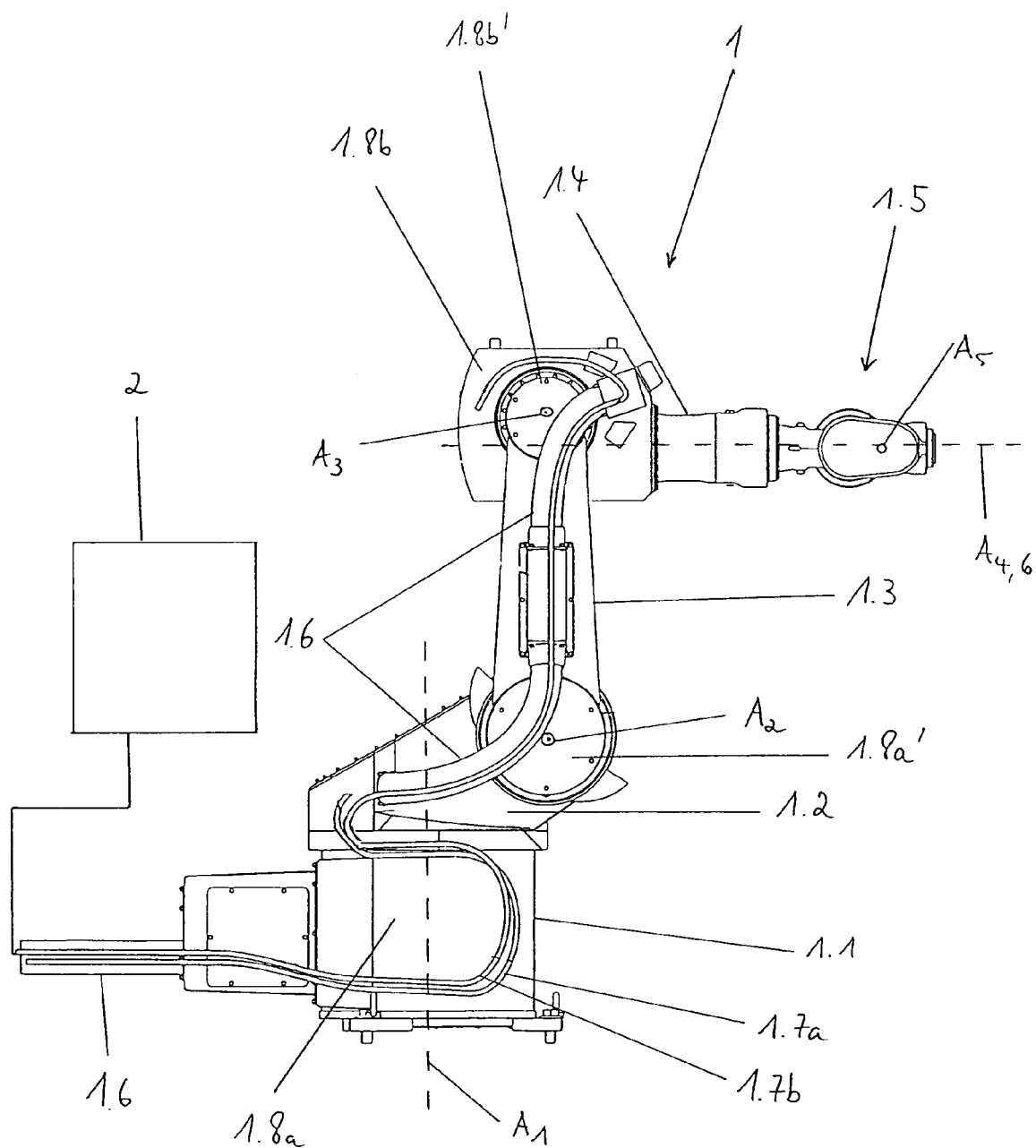
FIG. 1 A side view of a manipulator according to the invention.

FIG. 1 is a side view of a manipulator, in the form of a multiaxial industrial robot 1, according to the present invention. The latter has a basic frame 1.1, a carrousel 1.2, a rocker 1.3, a robot arm 1.4 and a robot hand 1.5, the individual parts 1.1 to 1.5 of the robot 1 and optionally its further subcomponents are able to perform relative to one another swivelling or rotary movements about axes A1 to A6. For the power supply and control of its drive units, the robot 1 is in part externally provided with not shown cable packages laid along its structure and which for the protection thereof against mechanical damage are surrounded by a protective hose 1.6. In addition to said protective hose 1.6, outside the structure of the robot 1 there are hoses 1.7a, 1.7b for a scavenging medium and laid at least zonally together with the protective hose 1.6.

In the embodiment shown, in the areas of the basic frame-carrousel-rocker and rocker-arm-hand, the robot 1 has two scavenging areas 1.8a, 1.8b, which comprise the motors and gears (drive units) of the axes A1 and A2 and axis A3, together with the hand axes A4 to A6. The scavenging areas 1.8a, 1.8b can be supplied by means of hoses 1.7a and 1.7b with a scavenging medium, e.g. for cooling, drying or disinfecting purposes. Outside the robot 1, but connected thereto by means of the protective hose 1.6 and the supply and control lines (not shown) carried therein, the inventive manipulator has a conditioning device 2 for the scavenging medium and this will be described in greater detail hereinafter relative to FIG. 2. According to the invention, the conditioning device 2 is positioned outside a contamination-endangered area (hygiene area) containing the robot 1.

According to the invention, the scavenging areas 1.8a, 1.8b are tightly sealed and for this purpose have covers 1.8a', 1.8b', which are provided with correspondingly suitable, here not shown sealing means.

In the case of the robot 1 of FIG. 1, the scavenging medium is removed from the scavenging areas 1.8a, 1.8b by means of the protective hose 1.6. However, alternatively it is also possible to have additional removal hoses like the hoses 1.7a, 1.7b for removing the scavenging medium. As a function of the treatment device 2 (cf. FIG. 2), the scavenging areas 1.8a, 1.8b of the robot 1 can be subject to the action of an overpressure compared with ambient pressure or with a reduced pressure or underpressure, the latter alternative being of particular interest for clean room applications. In this case a suction device 1.9 is provided (FIG. 2).

In particular as a result of the inventive return of the scavenging flow via the protective hose 1.6, there is a minimum and consequently inexpensive installation cost involved in the scavenging arrangement according to the invention.

Figure 2:
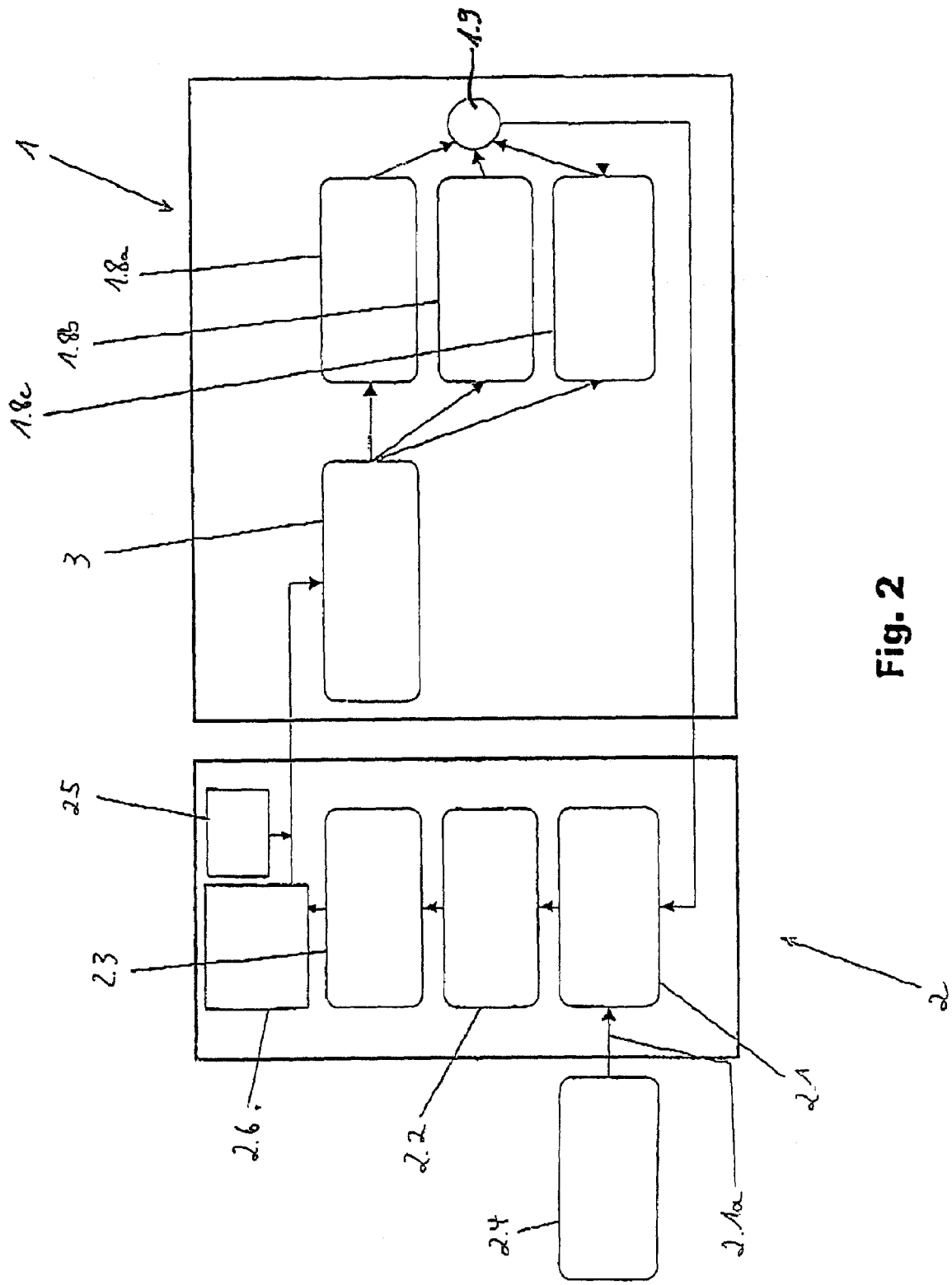
FIG. 2 The manipulator of FIG. 1 using a block diagram.

The manipulator 1 of FIG. 1 is shown again in a block diagram of FIG. 2 and on this occasion together with the conditioning or treatment device 2. Thus, the treatment device 2 has a drying device 2.1, a compressor device 2.2 and an air conditioning device 2.3, e.g. a cooling device. According to the invention, the drying device 2.1 is connected by means of a supply line 2.1a to a scavenging medium reservoir 2.4 and when air is used as the scavenging medium, e.g. with the ambient air. The treatment device 2 also has a supply device 2.5 for a disinfectant and a filtering device 2.6 for filtering out particles, such as abrasive particles, from the scavenging medium.

According to FIG. 2, besides the scavenging areas 1.8a, 1.8b described in FIG. 1, the robot 1 can have further scavenging areas 1.8c. According to the invention, the latter are supplied by means of a pressure regulating/distributing device 3 preferably located within the robot with the scavenging medium. The scavenging medium flow path is indicated by arrows in FIG. 2.

In particularly critical applications it is also possible by means of the supply device 2.5 in the treatment device 2, to supply a disinfectant to the scavenging medium, so that the scavenging areas 1.8a-1.8c can e.g. be cleaned with an antibacterial action. This ensures that no bacterial concentrations form in the interior of the robot 1. According to the invention, such a scavenging can also be used at prolonged intervals, but a permanent use, particularly in the food sector, does not appear appropriate due to a possible food contamination.

Besides the above-described use of the gaseous mixture air as the scavenging medium for scavenging the scavenging areas 1.8a-1.8c, for special uses use can be made of an inert gas (e.g. nitrogen) as the scavenging medium. In both cases the aforementioned addition of a disinfectant is possible.

The scavenging medium is supplied with an overpressure by compressor 2.2 to the robot 1 according to the embodiment of FIG. 2. If the scavenging medium is too moist and/or too hot in order to fulfil the possible functions of adequate drying and/or cooling, the scavenging medium to be fed in must be previously air conditioned and dried. This takes place within the treatment device through the drying device 2.1 or the air conditioning device (cooling device) 2.3. It is unimportant whether the scavenging medium flows in an open or a closed circuit, as shown in FIG. 2. As an alternative to FIG. 2, after flowing through the scavenging areas 1.8a-1.8c one or more times, the scavenging medium can be led off into the environment, preferably in the case of air when used as the scavenging medium, or following a treatment in the treatment device 2 it can be passed back to the robot 1.

The scavenging medium flow attainable with the invention is advantageously used for cooling the drive units of the robot 1, because in connection with the latter and in particular due to the sealing effect, the heat dissipation necessary during operation can only take place in a highly restricted manner. Moreover, pronounced temperature fluctuations in operation and in the switched off state can lead to an accumulation of condensation water in the interior of the robot 1. Such condensation water is removed through a dry scavenging medium, the heating by the motors and gears further assisting said process. Alternatively or additionally the scavenging medium can also flow in the dwell phases of the robot, so that also then condensation water formation is prevented. Through a clearly defined overpressure in the interior of the scavenging areas of the robot it is possible to prevent a penetration of dirt and spray water, particularly during a cleaning phase, through effective assistance by sealing means, such as sealing lips or the like. However, a preferred measure is constituted by overpressures in the range 0.1 to 0.5 bar. However, it is desirable, during the cleaning of the robot, e.g. using a high pressure cleaner, to significantly increase the pressure in the scavenging areas in order to significantly assist the seals, so that a high pressure jet of a cleaning apparatus cannot migrate beneath the seals of the scavenging areas. Technically appropriate values for the overpressure are in the range 0.5 to 1 bar. A danger of the seals becoming damaged is excluded, because the robot axes during cleaning are generally not or only very slowly moved.

The pressure regulating/distributing device 3 is used, according to the invention, for controlling a scavenging medium quantity in the scavenging areas 1.8b-18c, in that it limits an internal pressure in said areas. The total scavenging medium volume introduced results from the pressure applied through the compressor means 2.2 and a flow resistance in the removal line 1.6 for the scavenging medium. According to a further development of the invention, it is possible to additionally influence the pressure and scavenging medium volume by further not shown influencing means, such as a throttle valve in the removal line. If in addition to the compressor means 2.2 in the treatment device 2 there is a suitable, not shown pumping means, in the case of excessive flow resistances in the removal line the scavenging medium can be sucked off in a planned manner. Correspondingly, by means of such pumping means, it is also possible to produce underpressures in the vicinity of the scavenging areas 1.8a-1.8c, as explained hereinbefore. If in a further development of FIG. 2 for each scavenging area 1.8a, 1.8b and 1.8c a separate pressure regulating and distributing device 3 is used, the scavenging medium quantity at different points can be separately metered as required.

Important for the functionality of the above-described scavenging concept according to the invention is a clearly defined scavenging medium flow within the scavenging areas (1.8a-1.8c). This is inventively such that it is suitable both for a moisture discharge and for cooling purposes. The flow guidance takes place by constructional measures in the vicinity of the scavenging areas 1.8a-1.8c and is explained in greater detail hereinafter relative to FIG. 3.

Figure 3:
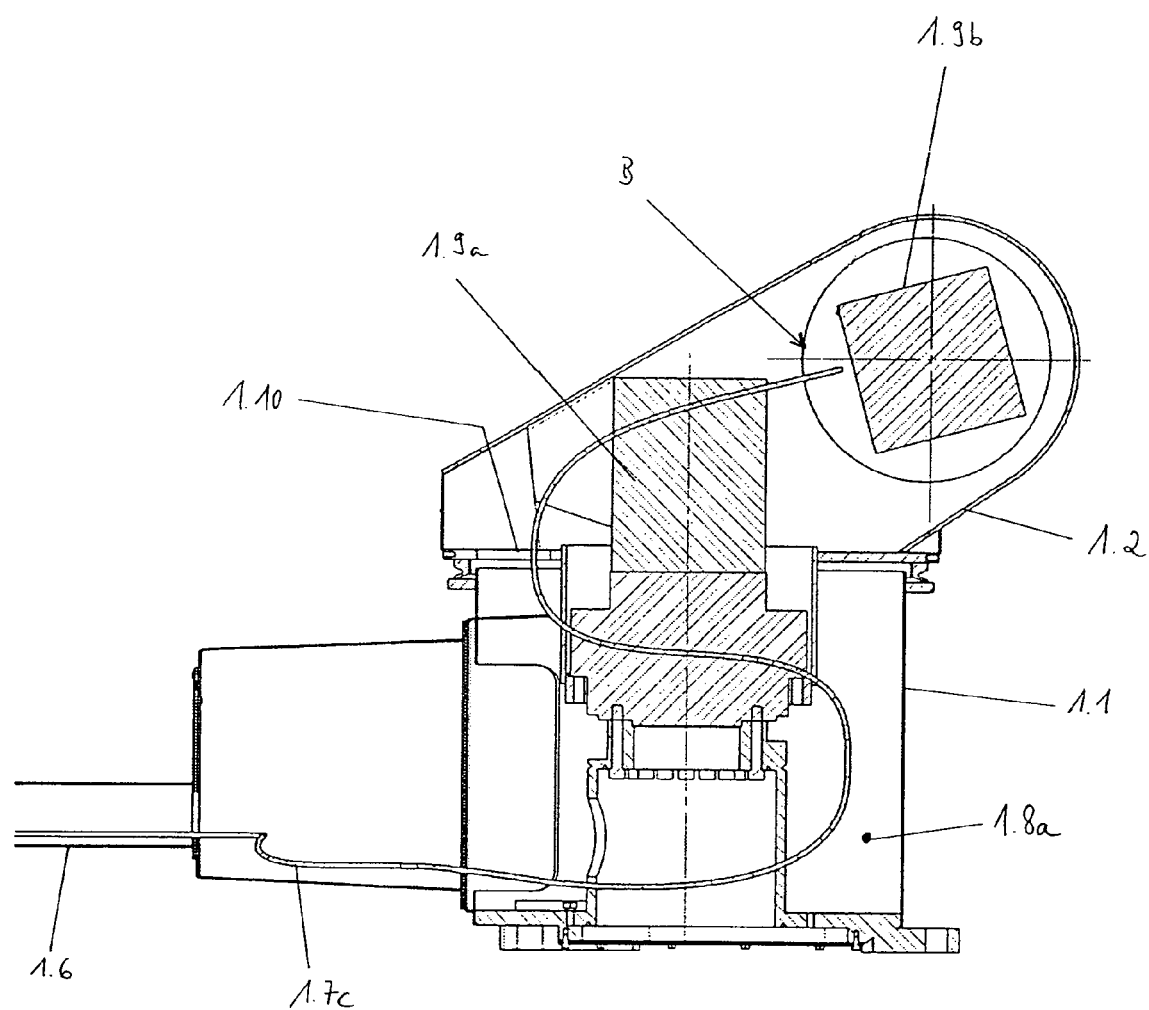
FIG. 3 A sectional representation of a scavenging area of the inventive manipulator of FIG. 1.

In a sectional view FIG. 3 shows a development of the inventive robot 1 in the vicinity of the scavenging area 1.8a. The latter is constructed in the vicinity of the base frame 1.1 and the carrousel 1.2 and according to FIG. 3 more particularly contains the motors 1.9a, 1.9b for the first and second robot axes A1 and A2. It is also possible to see a further hose 1.7c for scavenging medium supply. The latter is guided within the scavenging area 1.8a in such a way that in a feed area B there is a planned feed of the scavenging medium to the motor 1.9b for the second robot axis A2. The return scavenging medium flow is inventively guided via the removal line 1.6. As a result of the special arrangement shown of a scavenging medium passage 1.10 in a region of the scavenging area 1.8a which, considered from the motor 1.9b, is located behind the motor 1.9a for the first motor axis A1, within the scavenging area 1.8a there is a planned scavenging medium flow path from its feed area B, past motor 1.9a and through the passage 1.10 in the direction of the removal line 1.6. As a result of the above-described flow guidance, within the scavenging area 1.8a a clearly defined scavenging medium flow is obtained, so that it is suitable in optimized manner for the discharge of moisture and for cooling purposes.

LIST OF REFERENCE NUMERALS

1 Robot
1.1 Basic frame
1.2 Carrousel
1.3 Rocker
1.4 Robot arm
1.5 Robot hand
1.6 Protective hose
1.7a, 1.7b, 1.7c Hose
1.8a, 1.8b, 1.8c Scavenging area
1.8a', 1.8b' Cover
1.9a, 1.9b Motor
1.10 Passage
2 Treatment device
2.1 Drying device
2.1a Feed line
2.2 Compressor means
2.3 Air conditioning device 2.4 Pressure medium reservoir
2.5 Supply device
2.6 Filtering device
3 Pressure regulating/distributing device
A1-A6 Movement axis
B Feed area

The invention claimed is:

1. A manipulator for use in contamination-endangered environments, the manipulator comprising:
 a scavenging medium;
 a plurality of groups of drive units;
 a plurality of scavenging areas for receiving the scavenging medium, each scavenging area being in an area of one or more said drive units, wherein one of said groups of drive units is associated with one of said scavenging areas, said scavenging medium containing disinfecting substances in at least one of said scavenging areas.

2. Manipulator according to claim 1, wherein pressure is supplied to the scavenging areas.

3. Manipulator according to claim 1, wherein the scavenging medium is supplied and removed by hoses positioned externally on the manipulator.

4. Manipulator according to claim 1, wherein a plurality of supply and removal hoses are positioned with a cable arrangement for the supply and control of the drive units.

5. Manipulator according to claim 3, wherein the scavenging medium is removed via a protective hose of the cable arrangement.

6. Manipulator according to claim 2, wherein the supply and removal hoses for at least one scavenging area form a closed circuit.

7. Manipulator according to claim 2, wherein a scavenging medium removed from at least one scavenging area is delivered to the environment.

8. Manipulator according to claim 1, wherein a pressure of the scavenging medium is separately controllable in each scavenging area.

9. Manipulator according to claim 1, wherein a pressure of the scavenging medium in at least one scavenging area is above ambient pressure.

10. Manipulator according to claim 1, wherein an overpressure is produced at one of said scavenging areas, said overpressure being in a range from 0.1 to 1.0 bar.

11. Manipulator according to claim 1, wherein a pressure of said scavenging medium in at least one scavenging area is below ambient pressure.

12. Manipulator according to claim 1, wherein the scavenging medium from at least one scavenging area is removed via a suction device.

13. Manipulator according to claim 1, wherein at least one scavenging area has an inlet means and/or a deflecting means for influencing a scavenging medium flow.

14. Manipulator according to claim 1, wherein the scavenging medium is a gas or gaseous mixture.

15. Manipulator according to claim 1, wherein said scavenging medium is air in at least one of said scavenging areas.

16. Manipulator according to claim 1, wherein said scavenging medium is an inert gas in at least one of said scavenging areas.

17. Manipulator according to claim 1, wherein a drying device dries the scavenging medium.

18. Manipulator according to claim 1, wherein a filtering device removes particles from the scavenging medium.

19. Manipulator according to claim 1, wherein an air conditioning device cools and removes moisture from the scavenging medium.

20. Manipulator according to claim 1, wherein at least one of said scavenging areas associated with one or more said drive units is located in an area of a rotation axis of a carrousel and a swivelling axis of a rocker of a six-axis industrial robot.

21. Manipulator according to claim 1, wherein at least one of said scavenging areas associated with one or more said drive units of a robot arm or robot hand is located in an area of a swivelling axis of the robot arm of a six-axis industrial robot.

22. A method for influencing at least bacterial presence in the vicinity of drive units of a manipulator, the method comprising:
 providing a group of drive units;
 providing a plurality of scavenging areas, each scavenging area being associated with one of said group of drive units;
 a scavenging medium to one or more of said scavenging areas, said scavenging medium containing disinfecting substances.

23. Method according to claim 22, wherein one or more of said scavenging areas is supplied with overpressure.

24. Method according to claim 22, wherein a supply and removal of said scavenging medium is separately controlled for each scavenging area.

25. Method according to claim 22, wherein the scavenging medium is cooled, at least after flowing through one of said scavenging areas.

26. Method according to claim 22, wherein, at least after flowing through one of said scavenging areas, the scavenging medium is dried.

27. Method according to claim 22, wherein, at least after flowing through one of said scavenging areas, the scavenging medium is filtered.

28. Method according to claim 22, wherein said scavenging medium is mixed with said disinfecting substances, prior to said scavenging medium being supplied to one of said scavenging areas.

29. Method according to claim 22, wherein, at least after flowing through one of said scavenging areas, said scavenging medium is again supplied to said one of said scavenging areas.

30. Method according to claim 22, wherein, at least after flowing through one of said scavenging areas, said scavenging medium is delivered to the environment.

31. Method according to claim 22, wherein in at least one of said scavenging areas, said scavenging medium has a defined flow movement.

32. Method according to claim 22, wherein said scavenging medium is supplied to at least one of said scavenging areas with a pressure above ambient pressure.

33. Method according to claim 22, wherein the scavenging medium is supplied to at least one of said scavenging areas with a pressure less than ambient pressure.

34. A manipulator for use in contamination-endangered environments, the manipulator comprising:
 a scavenging medium;
 a plurality of drive units, each drive unit defining a scavenging area;
 a scavenging medium delivery means for delivering said scavenging medium to at least one said scavenging area such that one or more of a temperature, a moisture content, a pressure and a bacterial presence at one of said drive units is changed via delivery of said scavenging medium, said scavenging medium comprising a disinfectant in at least one said scavenging area.

* * * * *